US009260982B2

(12) United States Patent
Lehar et al.

(10) Patent No.: US 9,260,982 B2
(45) Date of Patent: Feb. 16, 2016

(54) SYSTEM AND METHOD OF WASTE HEAT RECOVERY

(71) Applicant: General Electric Company, Schenectady, NY (US)

(72) Inventors: Matthew Alexander Lehar, Munich (DE); Pierre Sebastien Huck, Munich (DE); Christian Vogel, Munich (DE)

(73) Assignee: General Electric Company, Niskayuna, NY (US)

( * ) Notice: Subject to any disclaimer, the term of this patent is extended or adjusted under 35 U.S.C. 154(b) by 170 days.

(21) Appl. No.: 13/905,811

(22) Filed: May 30, 2013

(65) Prior Publication Data

US 2014/0352308 A1     Dec. 4, 2014

(51) Int. Cl.
*F01K 23/06* (2006.01)
*F01K 23/10* (2006.01)
(Continued)

(52) U.S. Cl.
CPC . *F01K 23/10* (2013.01); *F01K 3/00* (2013.01); *F01K 7/02* (2013.01); *F01K 13/006* (2013.01); *F01K 19/10* (2013.01); *F01K 23/02* (2013.01); *F01K 23/04* (2013.01); *F01K 23/06* (2013.01); *F01K 23/08* (2013.01); *F01K 23/103* (2013.01);
(Continued)

(58) Field of Classification Search
CPC ........... F01K 23/04; F01K 23/02; F01K 7/02; F01K 13/006; F01K 19/10; F01K 23/06; F01K 23/08; F01K 23/10; F01K 23/103; F01K 25/103; F01K 25/06; F01K 25/08; F01K 25/10; F01K 3/00; F03G 7/04; Y02E 10/10; Y02E 10/46; Y02E 20/16

USPC .................... 60/645, 647, 655, 670
See application file for complete search history.

(56) References Cited

U.S. PATENT DOCUMENTS 3,436,911 A * 4/1969 Squires ...................... 60/39.181
4,573,321 A * 3/1986 Knaebel ......................... 60/649
(Continued)

FOREIGN PATENT DOCUMENTS

JP           60138214 A      7/1985
WO    WO 2013035822 A1 *  3/2013

OTHER PUBLICATIONS

Pak et al., "Closed Dual Fluid Gas Turbine Power Plant Without Emission of CO2 Into the Atmosphere", Proceedings of IFAC/IFORS/IAEE International Symposium on Energy Systems, Management and Economics, pp. 1-10, 1989.
(Continued)

*Primary Examiner* — Kenneth Bomberg
*Assistant Examiner* — Wesley Harris
(74) *Attorney, Agent, or Firm* — Andrew J. Caruso (57) ABSTRACT

A novel Rankine cycle system configured to convert waste heat into mechanical and/or electrical energy is provided. In one aspect, the system provided by the present invention comprises a novel configuration of the components of a conventional Rankine cycle system; conduits, ducts, heaters, expanders, heat exchangers, condensers and pumps to provide more efficient energy recovery from a waste heat source. In one aspect, the Rankine cycle system is configured such that an initial waste heat-containing stream is employed to vaporize a first working fluid stream, and a resultant heat depleted waste heat-containing stream is employed to aid in the production of a second vaporized working fluid stream. The Rankine cycle system is adapted for the use of supercritical carbon dioxide as the working fluid.

5 Claims, 5 Drawing Sheets

(51) Int. Cl.
 F01K 25/08 (2006.01)
 F01K 19/10 (2006.01)
 F01K 7/02 (2006.01)
 F03G 7/04 (2006.01)
 F01K 13/00 (2006.01)
 F01K 23/02 (2006.01)
 F01K 25/06 (2006.01)
 F01K 25/10 (2006.01)
 F01K 3/00 (2006.01)
 F01K 23/04 (2006.01)
 F01K 23/08 (2006.01)

(52) U.S. Cl.
 CPC ............ *F01K 25/06* (2013.01); *F01K 25/08* (2013.01); *F01K 25/10* (2013.01); *F01K 25/103* (2013.01); *F03G 7/04* (2013.01); *Y02E 10/10* (2013.01); *Y02E 10/46* (2013.01); *Y02E 20/16* (2013.01)

(56) References Cited

U.S. PATENT DOCUMENTS

| | | | |
|---|---|---|---|
| 5,754,613 A | 5/1998 | Hashiguchi et al. | |
| 6,510,695 B1 * | 1/2003 | Fisher | 60/780 |
| 7,197,876 B1 | 4/2007 | Kalina | |
| 8,240,149 B2 | 8/2012 | Lehar et al. | |
| 2010/0024421 A1 * | 2/2010 | Litwin et al. | 60/641.8 |
| 2011/0036091 A1 | 2/2011 | Waterstripe et al. | |
| 2011/0113780 A1 | 5/2011 | Lehar | |
| 2011/0209474 A1 * | 9/2011 | Leibowitz | 60/641.1 |
| 2012/0131918 A1 | 5/2012 | Held | |
| 2012/0131920 A1 * | 5/2012 | Held | F01K 13/02 60/650 |
| 2012/0174583 A1 | 7/2012 | Lehar | |

OTHER PUBLICATIONS

Zyhowski et al., "HFC-245fa Working Fluid in Organic Rankine Cycle—A Safe and Economic Way to Generate Electricity from Waste Heat", Efficiency, Cost, Optimization, Simulation and Environmental Impact of Energy, Lausanne, Switzerland, pp. 1-8, Jun. 14-17, 2010.

Persichilli et al., "Transforming Waste Heat to Power Through Development of a CO2—Based Power Cycle", Electric Power Expo, Rosemount, IL, USA, pp. 1-9, May 10-12, 2011.

Paanu et al., "Waste Heat Recovery—Bottoming Cycle Alternatives", University of Vaasa, pp. 1-26, 2012.

International Search Report and Written Opinion issued in connection with corresponding PCT Application No. PCT/US2014/036775 on May 6, 2015.

* cited by examiner

SYSTEM AND METHOD OF WASTE HEAT RECOVERY

BACKGROUND

The present invention deals with systems and methods for recovering energy from waste heat produced in human activities which consume fuel. In particular, the invention relates to the recovery of thermal energy from underutilized waste heat sources such as combustion turbine exhaust gases.

Human fuel burning activities over the centuries have been a central feature in both the development of human civilization and its continuance. The efficiency with which a fuel can be converted into energy remains a long standing problem; however, since much of the energy produced when a fuel is burned cannot be made to do useful work and is lost as waste energy, for example waste heat.

Rankine and other heat recovery cycles have been used innovatively to recover at least some of the energy present in waste heat produced by the combustion of fuel, and much progress has been achieved to date. The achievements of the past notwithstanding, further enhancements to Rankine cycle waste heat recovery systems and methods are needed.

BRIEF DESCRIPTION

In one embodiment, the present invention provides a Rankine cycle system comprising: (a) a heater configured to transfer heat from a first waste heat-containing stream to a first working fluid stream to produce a first vaporized working fluid stream and a second waste heat-containing stream; (b) a first expander configured to receive the first vaporized working fluid stream to produce therefrom mechanical energy and an expanded first vaporized working fluid stream; (c) a first heat exchanger configured to transfer heat from the expanded first vaporized working fluid stream and the second waste heat-containing stream to a first condensed working fluid stream to produce therefrom a second vaporized working fluid stream; (d) a second expander configured to receive the second vaporized working fluid stream to produce therefrom mechanical energy and an expanded second vaporized working fluid stream; and (e) a second heat exchanger configured to transfer heat from the expanded second vaporized working fluid stream to a second condensed working fluid stream, to produce therefrom a stream of the working fluid having greater enthalpy than the second condensed working fluid.

In an alternate embodiment, the present invention provides a Rankine cycle system comprising (a) a heater configured to transfer heat from a first waste heat-containing stream to a first working fluid stream to produce a first vaporized working fluid stream and a second waste heat-containing stream; (b) a first expander configured to receive the first vaporized working fluid stream to produce therefrom mechanical energy and an expanded first vaporized working fluid stream; (c) a first heat exchanger configured to transfer heat from the expanded first vaporized working fluid stream and the second waste heat-containing stream to a first condensed working fluid stream to produce therefrom a second vaporized working fluid stream, a heat depleted waste heat-containing stream and a first heat depleted working fluid stream; (d) a second expander configured to receive the second vaporized working fluid stream and to produce therefrom mechanical energy and an expanded second vaporized working fluid stream; (e) a second heat exchanger configured to transfer heat from the expanded second vaporized working fluid stream to a second condensed working fluid stream, to produce therefrom a stream of the working fluid having greater enthalpy than second condensed working fluid stream, and a second heat depleted working fluid stream; (f) a working fluid stream combiner configured to combine the first heat depleted working fluid stream with the second heat depleted working fluid stream to produce therefrom a consolidated heat depleted working fluid stream; (g) a condenser configured to receive the consolidated heat depleted working fluid stream and to produce therefrom a first consolidated condensed working fluid stream; (h) a working fluid pump configured to pressurize the first consolidated condensed working fluid stream and produce thereby a second consolidated condensed working fluid stream; and (i) at least one working fluid stream splitter configured to divide the second consolidated condensed working fluid stream into at least two condensed working fluid streams.

In yet another embodiment, the present invention provides a method of recovering thermal energy using a Rankine cycle system comprising: (a) transferring heat from a first waste heat-containing stream to a first working fluid stream to produce thereby a first vaporized working fluid stream and a second waste heat-containing stream; (b) expanding the first vaporized working fluid stream to produce thereby mechanical energy and an expanded first vaporized working fluid stream; (c) transferring heat from the expanded first vaporized working fluid stream, and the second waste heat-containing stream to a first condensed working fluid stream to produce thereby a second vaporized working fluid stream, a heat depleted second waste heat-containing stream and a first heat depleted working fluid stream; (d) expanding the second vaporized working fluid stream to produce thereby mechanical energy and the expanded second vaporized working fluid stream; and (e) transferring heat from the expanded second vaporized working fluid stream to a second condensed working fluid stream, to produce thereby a stream of the working fluid having greater enthalpy than the second condensed working fluid stream, and a second heat depleted working fluid stream.

BRIEF DESCRIPTION OF THE DRAWING FIGURES

Various features, aspects, and advantages of the present invention will become better understood when the following detailed description is read with reference to the accompanying drawings in which like characters may represent like parts throughout the drawings. Unless otherwise indicated, the drawings provided herein are meant to illustrate key inventive features of the invention. These key inventive features are believed to be applicable in a wide variety of systems comprising one or more embodiments of the invention. As such, the drawings are not meant to include all conventional features known by those of ordinary skill in the art to be required for the practice of the invention.

DETAILED DESCRIPTION

In the following specification and the claims, which follow, reference will be made to a number of terms, which shall be defined to have the following meanings.

The singular forms "a", "an", and "the" include plural referents unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the expression "configured to" describes the physical arrangement of two or more components of a Rankine cycle system required to achieve a particular outcome. Thus the expression "configured to" can be used interchangeably with expression "arranged such that", and those of ordinary skill in the art and having read this disclosure will appreciate the various arrangements of Rankine cycle system components intended based upon the nature of the outcome recited. The expression "configured to accommodate" in reference to a working fluid of a Rankine cycle system, means that the Rankine cycle system is constructed of components which when combined can safely contain the working fluid during operation.

As noted, in one embodiment, the present invention provides a Rankine cycle system useful for recovering energy from waste heat sources, for example the heat laden exhaust gas stream from a combustion turbine. The Rankine cycle system converts at least a portion of the thermal energy present in the waste heat source into mechanical energy which may be used in various ways. For example, the mechanical energy produced from the waste heat may be used to drive a generator, an alternator, or other suitable device capable of converting mechanical energy into electrical energy. In one or more embodiments the Rankine cycle system provided by the present invention comprises a plurality of devices configured to convert mechanical energy produced by the Rankine cycle system into electrical energy, for example a Rankine cycle system comprising two or more generators, or a Rankine cycle system comprising a generator and an alternator. In an alternate embodiment, the Rankine cycle system provided by the present invention coverts latent energy contained in a working fluid to mechanical energy and employs at least a portion of the mechanical energy produced to power a component of the system, for example a pump used to pressurize the working fluid.

In one or more embodiments, the Rankine cycle system provided by the present invention comprises a heater configured to transfer heat from a first waste heat-containing stream to a first working fluid stream to produce a first vaporized working fluid stream and a second waste heat-containing stream. The waste heat-containing stream may be any waste heat-containing gas, liquid, fluidized solid, or multiphase fluid from which heat may be recovered. As used herein, the term "heater" describes a device which brings a waste heat source such as a waste heat-containing stream into thermal contact with the working fluid of a Rankine cycle system, such that heat is transferred from the waste heat source to the working fluid without bringing the waste heat source into direct contact with the working fluid, i.e. the waste heat source does not mix with the working fluid. Such heaters are commercially available and are known to those of ordinary skill in the art. For example, the heater can be a duct through which a waste heat-containing stream may be passed such as that disclosed in United States Patent Application US2011-0120129 A1 filed Nov. 24, 2009 and which is incorporated by reference herein in its entirety. The working fluid may be brought into thermal contact with the waste heat-containing stream by means of tubing disposed within the duct and providing a conduit through which the working fluid is passed without direct contact with the waste heat-containing stream. A flowing working fluid enters the tubing within the duct at a first working fluid temperature, receives heat from the waste heat-containing stream flowing through the duct, and exits the tubing within the duct at a second working fluid temperature which is higher than the first working fluid temperature. The waste heat-containing stream enters the duct at a first waste heat-containing stream temperature, and having transferred at least a portion of its thermal energy to the working fluid, exits the duct at a second waste heat-containing stream temperature which is lower than the first waste heat-containing stream temperature.

Figure 5:
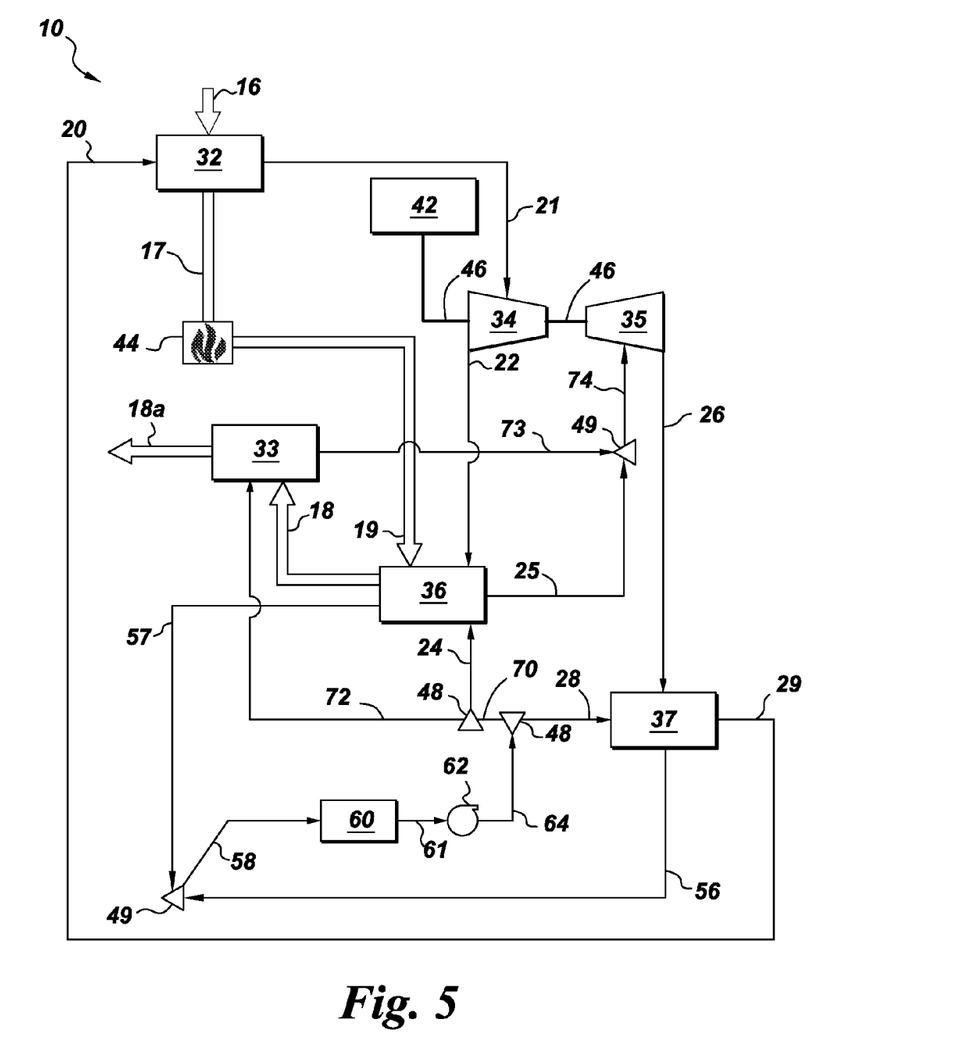
FIG. 5 represents a fifth embodiment of the present invention.
Figure 6:
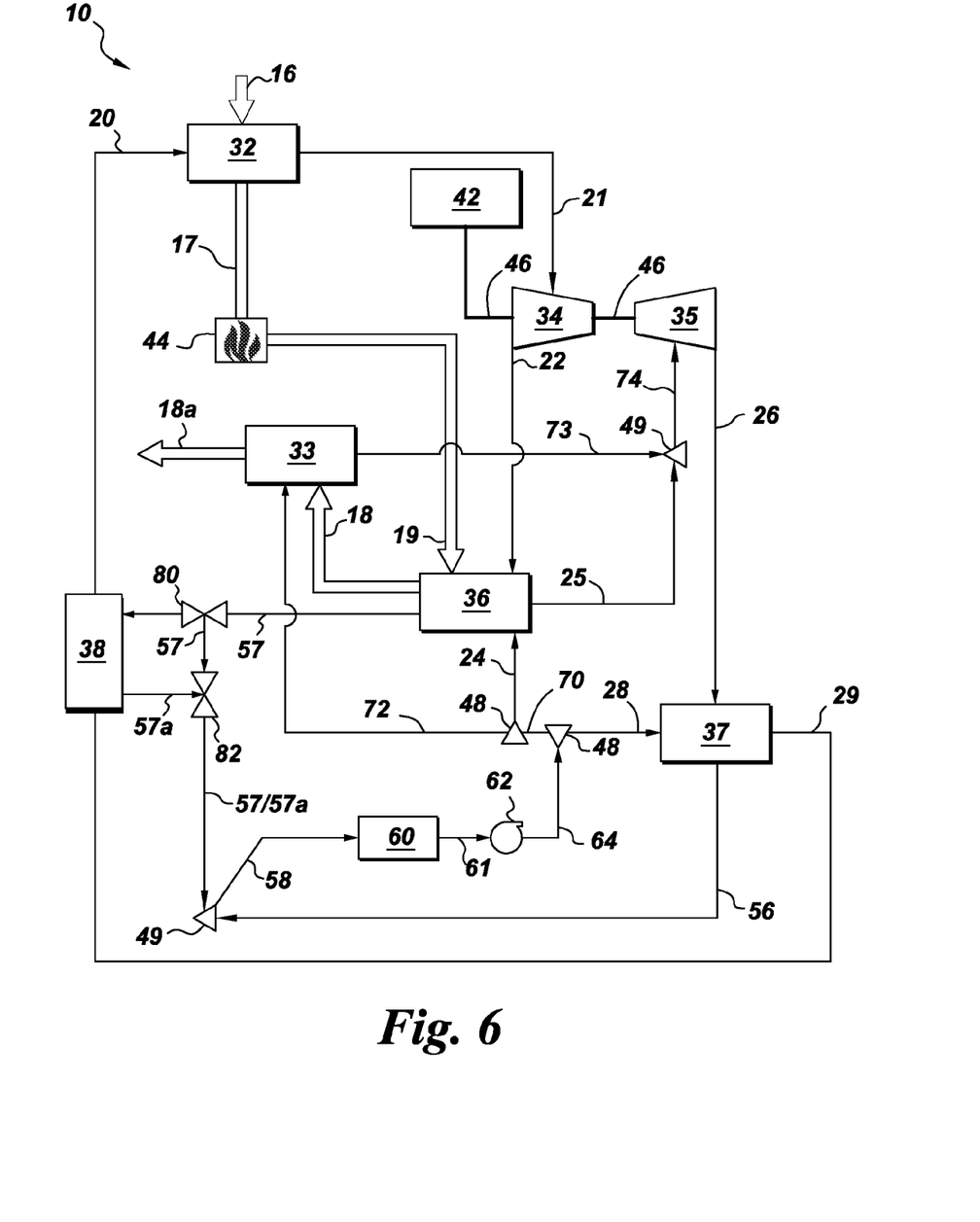
FIG. 6 represents a sixth embodiment of the present invention.

As used herein, the term "heater" is reserved for devices which are configured to transfer heat from a waste heat source such as a waste heat-containing stream to a working fluid, and are not configured to exchange heat between a first working fluid stream and a second working fluid stream. Heaters are distinguished herein from heat exchangers which are configured to allow heat exchange between a first working fluid stream and a second working fluid stream. This distinction is illustrated in FIG. 5 of this disclosure in which heaters 32 and 33 transfer heat from a waste heat-containing stream, waste heat-containing streams 16 and 18 respectively, to working fluid streams 20 and 72 respectively. Those of ordinary skill in the art will appreciate that numbered system components 36 and 37 shown in FIG. 5 and numbered system component 38 shown in FIG. 6 are configured to exchange heat between a first working fluid stream and a second working fluid stream and qualify as heat exchangers as defined herein and do not qualify as "heaters" as defined herein, this despite the fact that heat exchanger 36 is configured to transfer heat both from a waste heat-containing stream 19 (FIG. 5 and FIG. 6) and an expanded first vaporized working fluid stream 22 to a first condensed working fluid stream 24.

Suitable heaters which may be used in accordance with one or more embodiments of the invention include duct heaters as noted, fluidized bed heaters, shell and tube heaters, plate heaters, fin-plate heaters, and fin-tube heaters.

Suitable heat exchangers which may be used in accordance with one or more embodiments of the invention include shell and tube type heat exchangers, printed circuit heat exchangers, plate-fin heat exchangers and formed-plate heat exchangers. In one or more embodiments of the present invention the Rankine cycle system comprises at least one heat exchanger of the printed circuit type.

The working fluid used according to one or more embodiments of the invention may be any working fluid suitable for use in a Rankine cycle system, for example carbon dioxide.

Additional suitable working fluids include, water, nitrogen, hydrocarbons such as cyclopentane, organic halogen compounds, and stable inorganic fluids such as $SF_6$. In one embodiment, the working fluid is carbon dioxide which at one or more locations within the Rankine cycle system may be in a supercritical state.

Although the Rankine cycle system is essentially a closed loop in which the working fluid is variously heated, expanded, condensed, and pressurized; it is useful to regard the working fluid as being made up of various working fluid streams as a means of specifying the overall configuration of the Rankine cycle system. Thus, a first working fluid stream enters a heater where it picks up waste heat from a waste heat source and is transformed from a first working fluid stream into a first vaporized working fluid stream.

The expression "vaporized working fluid" when applied to a highly volatile working fluid such as carbon dioxide which has boiling point of −56° C. at 518 kPa, simply means a gaseous working fluid which is hotter than it was prior to its passage through a heater or heat exchanger. It follows then, that the term vaporized as used herein need not connote the transformation of the working fluid from a liquid state to a gaseous state. A vaporized working fluid stream may be in a supercritical state when produced by passage through a heater and/or a heat exchanger of the Rankine cycle system provided by the present invention.

Similarly the term "condensed" when applied to a working fluid need not connote a working fluid in a liquid state. In the context of a working fluid such as carbon dioxide, a condensed working fluid simply means a working fluid stream which has been passed through a condenser unit, at times herein referred to as a working fluid condenser. Thus, the term "condensed working fluid" may in some embodiments actually refer to a working fluid in a gaseous state or supercritical state. Suitable condensing or cooling units which may be used in accordance with one or more embodiments of the invention include fin-tube condensers and plate-fin condenser/coolers. In one or more embodiments, the present invention provides a Rankine cycle system comprising a single working fluid condenser. In an alternate set of embodiments, the present invention provides a Rankine cycle system comprising a plurality of working fluid condensers.

The term "expanded" when applied to a working fluid describes the condition of a working fluid stream following its passage through an expander. As will be appreciated by those of ordinary skill in the art, some of the energy contained within a vaporized working fluid is converted to mechanical energy as it passes through the expander. Suitable expanders which may be used in accordance with one or more embodiments of the invention include axial- and radial-type expanders.

In one or more embodiments the Rankine cycle system provided by the present invention further comprises a device configured to convert mechanical energy into electrical energy, such as a generator or an alternator which may be driven using the mechanical energy produced in the expander. In one or more alternate embodiments, the Rankine cycle system comprises a plurality of devices configured to convert mechanical energy produced in the expander into electric power. Gearboxes may be used to connect the expansion devices with the generators/alternators. Additionally, transformers and inverters may be used to condition the electric current produced by the generators/alternators.

Turing now to the figures, the figures represent essential features of Rankine cycle systems provided by the present invention. The various flow lines indicate the direction of flow of waste heat-containing streams and working fluid streams through the various components of the Rankine cycle system. As will be appreciated by those of ordinary skill in the art, waste heat-containing streams and working fluid streams are appropriately confined in the Rankine cycle system. Thus, for example, each of the lines indicating the direction of flow of the working fluid represents a conduit integrated into the Rankine cycle system. Similarly, large arrows indicating the flow of waste heat-containing streams are meant to indicate streams flowing within appropriate conduits (not shown). In Rankine cycle systems configured to use carbon dioxide as the working fluid, conduits and equipment may be selected to safely utilize supercritical carbon dioxide using Rankine cycle system components known in the art.

Figure 1:
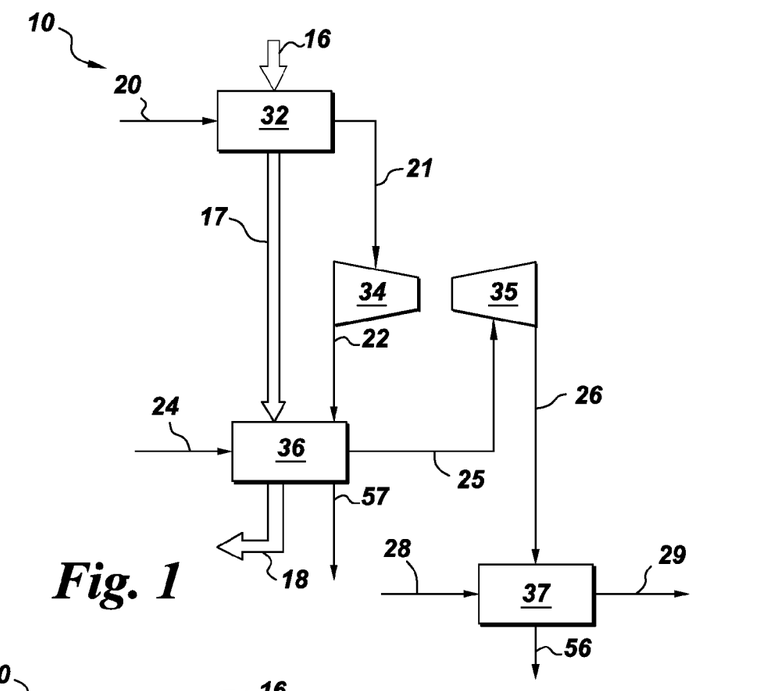
FIG. 1 represents a first embodiment of the present invention.

Referring to FIG. 1, the figure represents a key components of a Rankine cycle system 10 provided by the present invention. In the embodiment shown, a first working fluid stream 20 is introduced into a heater 32 where it is brought into thermal contact with a first waste heat-containing stream 16. First working fluid stream 20 gains heat from the hotter first waste heat-containing stream 16 and is transformed by its passage through the heater into first vaporized working fluid stream 21 which is then presented to first expander 34. The first waste heat-containing stream 16 is similarly transformed into a lower energy second waste heat-containing stream 17. At least a portion of the energy contained in first vaporized working fluid stream 21 is converted into mechanical energy in the expander. The expanded first vaporized working fluid stream 22 which exits the first expander and the second waste heat-containing stream 17 are then introduced separately (without their being physically mixed together) into a first heat exchanger 36 where residual heat from both the expanded first vaporized working fluid stream 22 and the second waste heat-containing stream 17 is transferred to a first condensed working fluid stream 24 produced elsewhere in the Rankine cycle system 10. The expanded first vaporized working fluid stream 22 and the second waste heat-containing stream 17 are transformed in heat exchanger 36 into first heat depleted working fluid stream 57 and heat depleted second waste heat-containing stream 18 respectively.

Still referring to FIG. 1, first condensed working fluid stream 24, having taken on heat from second waste heat-containing stream 17 and expanded first vaporized working fluid stream 22, is transformed in heat exchanger 36 into second vaporized working fluid stream 25. In one or more embodiments, the second vaporized working fluid stream 25 is characterized by a lower temperature than that of first vaporized working fluid stream 21. The second vaporized working fluid stream 25 is then presented to a second expander 35 to produce mechanical energy and is transformed into expanded second vaporized working fluid stream 26. A second heat exchanger 37 is configured to receive expanded second vaporized working fluid stream 26 where residual heat contained in the expanded second vaporized working fluid stream is transferred to a second condensed working fluid stream 28 produced elsewhere in the Rankine cycle system. Second condensed working fluid stream 28 is transformed into a working fluid stream 29 having greater enthalpy than second condensed working fluid stream 28. Expanded second vaporized working fluid stream 26 is transformed in second heat exchanger 37 into second heat depleted working fluid stream 56. In one or more embodiments of the present invention, the first condensed working fluid stream 24 and the second condensed working fluid stream 28 are produced from a common condensed working fluid stream produced within the Rankine cycle system.

Figure 2:
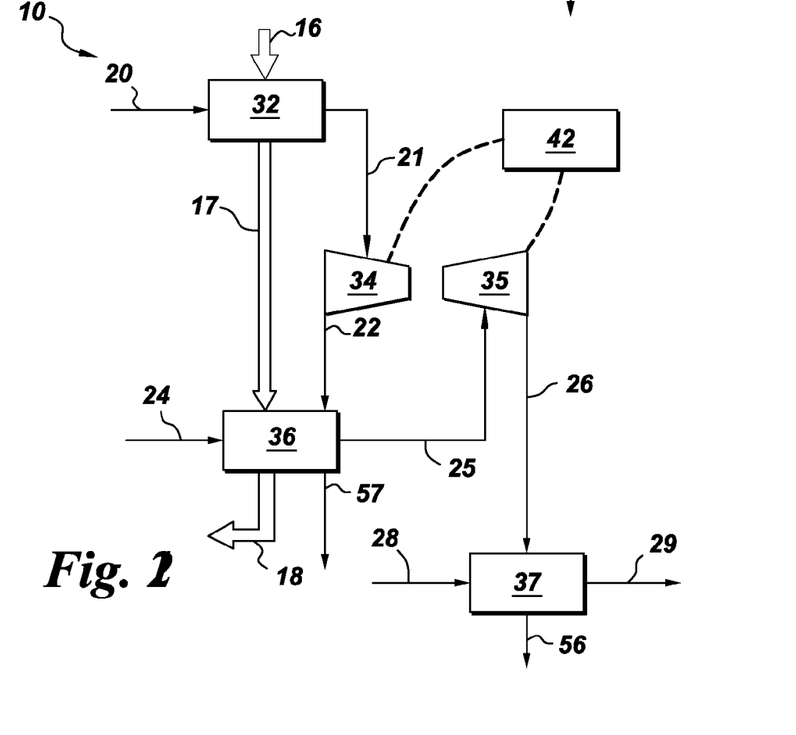
FIG. 2 represents a second embodiment of the present invention.

Referring to FIG. 2, the figure represents a Rankine cycle system 10 provided by the present invention and configured as in FIG. 1 but with the addition of a generator 42 configured to utilize mechanical energy produced by one or both of expanders 34 and 35.

Figure 3:
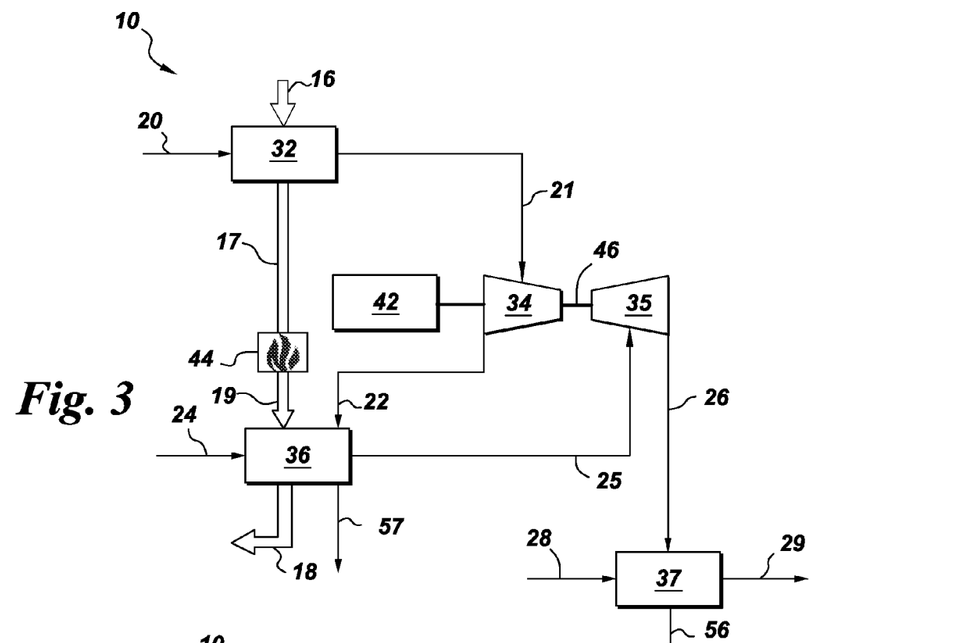
FIG. 3 represents a third embodiment of the present invention.

Referring to FIG. 3, the figure represents a Rankine cycle system 10 provided by the present invention and configured as in FIG. 1 and FIG. 2 but with the addition of a generator 42 mechanically coupled to both of expanders 34 and 35 via common drive shaft 46. In addition, the Rankine cycle system shown in FIG. 3 comprises a duct heater 44 configured to increase the temperature of second exhaust gas stream 17. Thus second exhaust gas stream 17 is transformed in duct heater 44 into a hotter second exhaust gas stream 19, at times herein referred to as thermally enhanced second exhaust gas stream 19. The presence of the duct heater provides additional flexibility for use of Rankine cycle system. For example, a duct heater allows the temperature of a stream to be raised until it equals the temperature of a second stream that it joins downstream of the heater. Tuning the stream temperature in this fashion minimizes exergetic losses due to the junction of two or more streams having different temperatures.

Figure 4:
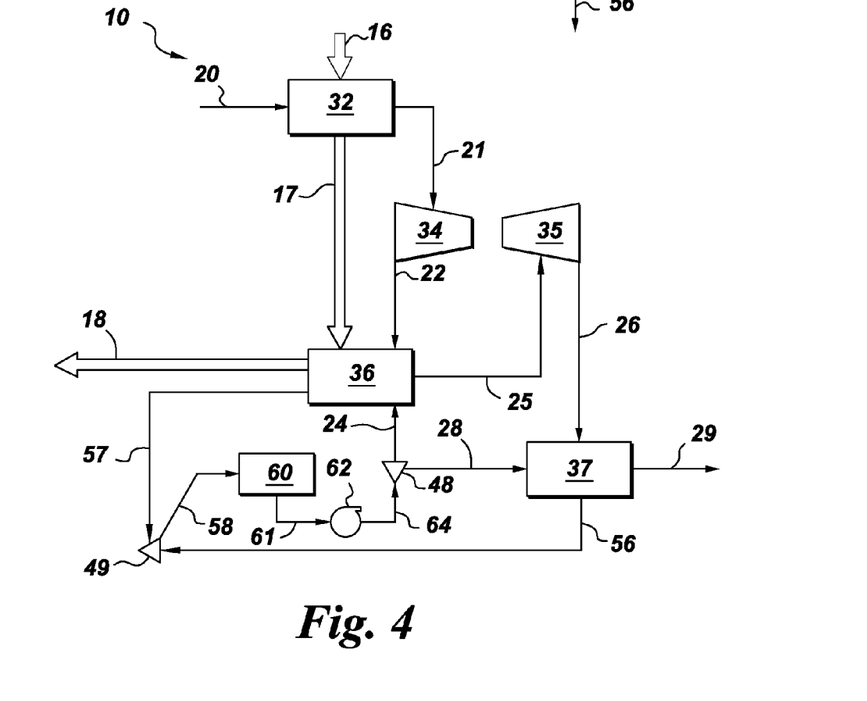
FIG. 4 represents a fourth embodiment of the present invention.

Referring to FIG. 4, the figure represents a Rankine cycle system 10 provided by the present invention and configured as in FIG. 1 and further illustrating the consolidation of heat depleted streams 57 and 56 into a consolidated heat depleted stream 58 which is transformed into first and second condensed working fluid streams 24 and 28. Thus, heat depleted streams 57 and 56 are combined at working fluid stream combiner 49 to provide consolidated working fluid stream 58 which by the action of condenser/cooler 60 is transformed into first consolidated condensed working fluid stream 61 which is pressurized by working fluid pump 62 to provide a second consolidated condensed working fluid stream 64. Working fluid stream 64 is then presented to working fluid stream splitter 48 which converts stream 64 into first condensed working fluid stream 24 and second condensed working fluid stream 28.

Referring to FIG. 5, the figure represents a Rankine cycle system 10 provided by the present invention. The system comprises components in common with the embodiments shown in FIG. 3 and FIG. 4, but further comprises a second heater 33 which is used to capture additional heat not captured by thermal contact between thermally enhanced second waste heat-containing stream 19 and first condensed working fluid stream 24 in first heat exchanger 36. In the embodiment shown, a first working fluid stream 20 (which is the same stream as working fluid stream 29, there being no intervening active transformation) is thermally contacted with first exhaust gas stream 16 in heater 32 to produce first vaporized working fluid stream 21 and second exhaust gas stream 17. Duct heater 44 transforms second exhaust gas stream 17 into thermally enhanced second exhaust gas stream 19 prior to its being introduced into first heat exchanger 36. First vaporized working fluid stream 21 is expanded in first expander 34 which is joined by common drive shaft 46 to both second expander 35 and generator 42. As in the embodiments shown in FIG. 3 and FIG. 4, the expanded working fluid stream 22 is introduced into first heat exchanger 36 where it gives up heat to first condensed working fluid stream 24 to produce second vaporized working fluid stream 25 and first heat depleted working fluid stream 57. In the embodiment shown, first condensed working fluid stream 24 and second condensed working fluid stream 28 are produced from condensed working fluid stream 64 as follows. Condensed working fluid stream 64 is presented to a first working fluid stream splitter 48 which converts stream 64 into condensed working fluid stream 28 and an intermediate condensed working fluid stream 70, at times herein referred to as third condensed working fluid stream 70, which is subsequently divided at a second working fluid stream splitter 48 into condensed working fluid stream 24 and a fourth condensed working fluid stream 72. Condensed working fluid stream 72 is introduced into the second heater 33 where it takes on heat from heat depleted second waste heat-containing stream 18 and is transformed into third vaporized working fluid stream 73. Heat depleted stream 18 is further cooled by its passage through heater 33 and exits the heater as further heat depleted stream 18a. The second vaporized working fluid stream 25 and third vaporized working fluid stream 73 are combined in working fluid stream combiner 49 to produce consolidated vaporized working fluid stream 74 which is then introduced into second expander 35.

Still referring to FIG. 5, the expanded second vaporized working fluid stream 26 is introduced into second heat exchanger 37 where it transfers heat to second condensed working fluid stream 28, itself produced from consolidated condensed working fluid stream 64 at working fluid stream splitter 48. In the embodiment shown, second condensed working fluid stream 28 is transformed into working fluid stream 29 which is not further actively transformed prior to its being reintroduced into heater 32 as first working fluid stream 20. As used herein the term "actively transformed" refers to a waste heat-containing stream or working fluid stream which has been subjected to a step in which it has been split into two or more streams, combined with one or more streams, heated, vaporized, expanded, condensed, pressurized, cooled, or undergone some combination of two or more of the foregoing transformative operations.

Referring to FIG. 6, the figure represents a Rankine cycle system provided by the present invention configured as in FIG. 5 but further comprising a third heat exchanger 38 which is used to capture residual heat present in first heat depleted working fluid stream 57. In the embodiment shown, heat depleted stream 57 is presented to valve 80 which may be actuated to allow passage of the entire working fluid stream 57, a portion of working fluid stream 57, or none of working fluid stream 57, through third heat exchanger 38. A second valve 82 may be actuated to allow passage of further heat depleted working fluid stream 57a only, to allow passage of a combination of streams 57 and 57a, or to allow passage of stream 57 only. For convenience, the working fluid stream downstream of valve 82 but upstream of working fluid stream combiner 49 is referred to as stream 57/57a.

Various system components are well known to those of ordinary skill in the art, for example; working fluid stream splitters, working fluid stream combiners, working fluid pumps and working fluid condensers, and are commercially available.

In addition to providing Rankine cycle systems, the present invention provides a method of recovering thermal energy using a Rankine cycle system. One or more embodiments the method are illustrated by FIGS. 1-6. Thus in one embodiment, the method comprises (a) transferring heat from a first waste heat-containing stream 16 to a first working fluid stream 20 to produce thereby a first vaporized working fluid stream 21 and a second waste heat-containing stream 17; (b) expanding the first vaporized working fluid stream 21 to produce thereby mechanical energy and an expanded first vaporized working fluid stream 22; (c) transferring heat from the expanded first vaporized working fluid stream 22 and the second waste heat-containing stream 17 to a first condensed working fluid stream 24 to produce thereby a second vaporized working fluid stream 25, a heat depleted second waste heat-containing stream 18 and a first heat depleted working fluid stream 57; (d) expanding the second vaporized working fluid stream 25 to produce thereby mechanical energy and the expanded second vaporized working fluid stream 26; and (e) transferring heat from the expanded second vaporized working fluid stream 26 to a second condensed working fluid stream 28, to produce thereby a stream 29 of the working fluid having greater enthalpy than the second condensed working fluid stream 28, and a second heat depleted working fluid stream 56.

In one or more embodiments, the method provided by the present invention further comprises a step (f): combining the first heat depleted working fluid stream 57 with the second heat depleted working fluid stream 56 to produce thereby a consolidated heat depleted working fluid stream 58.

In one or more embodiments, the method provided by the present invention further comprises a step (g): condensing the consolidated heat depleted working fluid stream 58 to produce thereby a first consolidated condensed working fluid stream 61.

In one or more embodiments, the method provided by the present invention further comprises a step (h): pressurizing the first consolidated condensed working fluid stream 61 to produce thereby a second consolidated condensed working fluid stream 64.

In one or more embodiments, the method provided by the present invention further comprises a step (i): dividing the second consolidated condensed working fluid stream 64 to produce thereby at least two condensed working fluid streams.

In one or more embodiments, the method provided by the present invention utilizes carbon dioxide as the working fluid and wherein the carbon dioxide is in a supercritical state during at least a portion of at least one method step.

In one or more embodiments, the methods and system provided by the present invention may be used to capture and utilize heat from a waste heat-containing stream which is an exhaust gas stream produced by a combustion turbine.

Experimental Part

A laboratory-scale Rankine cycle system was constructed and tested in order to demonstrate both the operability of a supercritical carbon dioxide Rankine cycle system and verify performance characteristics of individual components of the Rankine cycle system suggested by their manufacturers, for example the effectiveness of the printed circuit heat exchangers. The experimental Rankine cycle system was configured as in FIG. 4 with the exception that first expander 34 and second expander 35 were replaced by expansion valves, and stream 61 was divided and sent to a first working fluid pump and second working fluid pump to provide the first condensed working fluid stream 24 and the second condensed working fluid stream 28 respectively. In addition, the Rankine cycle system did not employ a first waste heat-containing stream 16 and relied instead on electric heating elements to heat the first working fluid stream 20. The working fluid was carbon dioxide. The incremental effect of transferring heat either from the second waste heat-containing stream 17 or a thermally enhanced second waste heat-containing stream 19 to the first heat exchanger 36 may be approximated by adding heating elements to heat exchanger 36. The experimental system provided a framework for additional simulation studies discussed below. In particular, data obtained experimentally could be used to confirm and/or refine the predicted performance of embodiments of the present invention.

Two software models were employed to predict the performance of Rankine cycle systems provided by the present invention. The first of these software models "EES" (Engineering Equation Solver) available from F-Chart Software (Madison, Wis.), is an equation-based computational system that allowed the predictive optimization of Rankine cycle system operating conditions as evidenced at system state points for best overall performance. Further insights into how best to operate the Rankine cycle system were obtained using Aspen HYSYS, a comprehensive process modeling system available from AspenTech.

Figure 7:
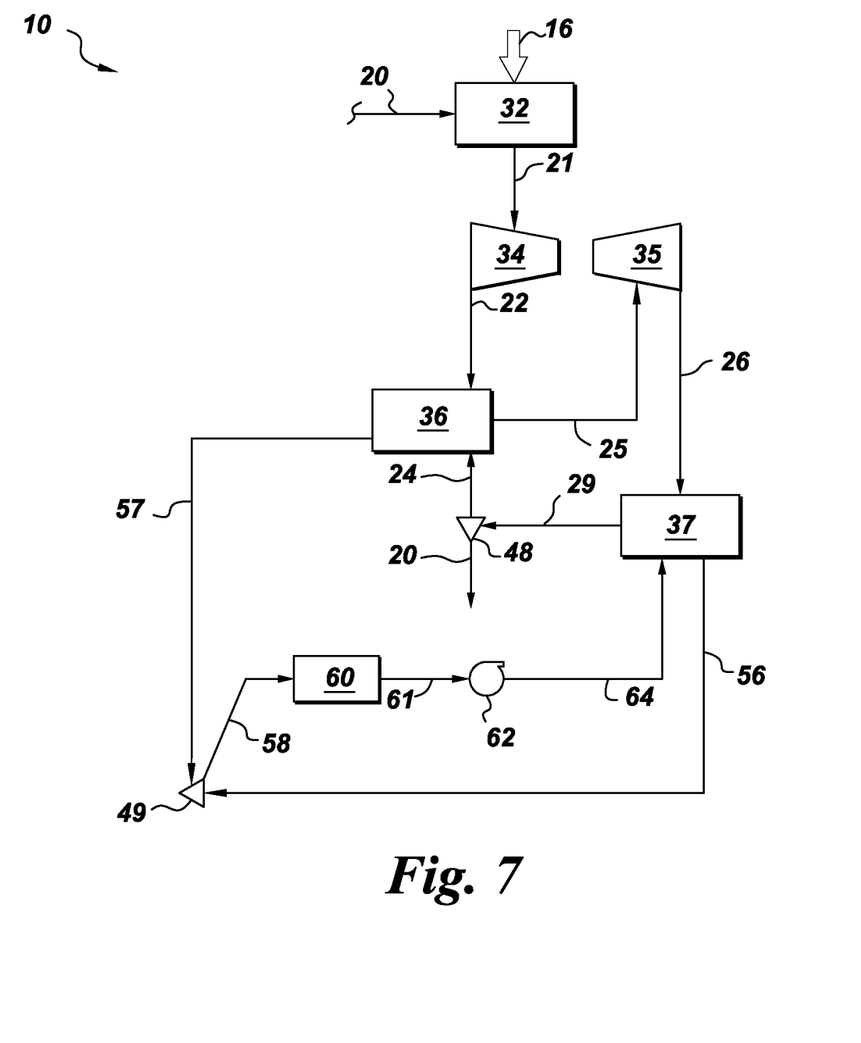
FIG. 7 represents an alternately configured Rankine cycle system.

A Rankine cycle system provided by the present invention and configured as in FIG. 4 was evaluated (Example 1) using an EES software model using the Spann-Wagner equation of state for carbon dioxide. The Rankine cycle system of Example 1 was compared with three other Rankine cycle systems. The first (Comparative Example 1) was a simple Rankine cycle system comprising a single expander, and a single heat exchanger but scaled appropriately so that a meaningful comparison with Example 1 and Comparative Examples 2-3 could be made. The second comparison (Comparative Example 2) was with a Rankine cycle system configured as in FIG. 7. The principal difference between the Rankine cycle system of Example 1 and the Rankine cycle system of Comparative Example 2 was that in Comparative Example 2, second consolidated working fluid stream 64 was presented to second heat exchanger 37, and thereafter, working fluid stream 29 exiting second heat exchanger 37 was transformed by working fluid stream splitter 48 into first working fluid stream 20 and first condensed working fluid stream 24. A third comparison (Comparative Example 3) was configured as in FIG. 4 with the exception that no second waste heat-containing stream was directed to first heat exchanger 36. The data presented in Table 1 illustrate the advantages of the Rankine cycle system provided by the present invention relative to alternate Rankine cycle system configurations.

The Rankine cycle systems of Example 1 and Comparative Examples 1-3 were modeled under a set of sixteen different steady state conditions, each steady state being characterized by a lowest system $CO_2$ working fluid temperature which varied from about 10° C. in the first steady state to about 50° C. in the sixteenth steady state. The predicted performance of the Rankine cycle systems depended on the ambient temperature and was also subject to a minimum allowable temperature for the waste heat-containing stream as it exits the system of about 130° C. This lower temperature limit is consistent with typical design guidelines for waste-heat recovery from the exhaust streams of combustion engines such as gas turbines, serving to prevent the condensation of corrosive acid gas within the exhaust duct. The power output of the model Rankine cycle systems could also be estimated using experimentally measured state points using the laboratory-scale Rankine cycle system as input for the computer simulation tool. The power output of each of the Rankine cycle systems studied fell steadily as the lowest system $CO_2$ working fluid temperature increased.

Data are presented in Table 1 below which compare the power output of a Rankine cycle system provided by the present invention (Example 1) with a conventional Rankine cycle system (Comparative Example 1) and alternately configured Rankine cycle systems of similar complexity (Comparative Examples 2-3).

TABLE 1

Example 1 versus Comparative Examples 1-3

| Lowest $CO_2$ Temp ° C. | Example 1 Power Output (kW) | Comparative Example 1 Power Output (kW) | Comparative Example 2 Power Output (kW) | Comparative Example 3 Power Output (kW) | Example 1 Advantage* |
| --- | --- | --- | --- | --- | --- |
| 12.76 | 7083 | 6571 | 6651.5 | 7083 | 6.5% |
| 14.14 | 7041 | 6438 | 6588 | 7041 | 6.9% |
| 16.9 | 6955 | 6167 | 6456 | 6955 | 7.7% |

TABLE 1-continued

Example 1 versus Comparative Examples 1-3

| Lowest CO$_2$ Temp ° C. | Example 1 Power Output (kW) | Comparative Example 1 Power Output (kW) | Comparative Example 2 Power Output (kW) | Comparative Example 3 Power Output (kW) | Example 1 Advantage* |
|---|---|---|---|---|---|
| 19.66 | 6865 | 5889 | 6317 | 6865 | 8.7% |
| 22.41 | 6773 | 5604 | 6171 | 6773 | 9.8% |
| 25.17 | 6675 | 5309 | 6018 | 6675 | 10.9% |
| 26.55 | 6624 | 5156 | 5938 | 6624 | 11.6% |
| 29.31 | 6505 | 4827 | 5769 | 6420 | 12.8% |
| 32.07 | 6372 | 4453 | 5566 | 6062 | 14.5% |
| 34.83 | 6232 | 4113 | 5336 | 5713 | 16.8% |
| 37.59 | 6091 | 3811 | 5044 | 5381 | 20.8% |
| 38.97 | 6022 | 3674 | 4893 | 5222 | 23.1% |
| 41.72 | 5890 | 3425 | 4610 | 4920 | 27.8% |
| 44.48 | 5762 | 3208 | 4352 | 4641 | 32.4% |
| 47.24 | 5638 | 3025 | 4119 | 4386 | 36.9% |
| 50 | 5517 | 2877 | 3912 | 4156 | 41.0% |

Example 1 configured as in FIG. 4; Comparative Example 1 = basic Rankine cycle configuration, Comparative Example 2 configured as in FIG. 7, *Example 1 Advantage relative to Comparative Example 2

The data presented in Table 1 show a significant improvement in power output of the Rankine cycle system provided by the present invention relative to a baseline, standard Rankine cycle configuration (Comparative Example 1) and alternately configured Rankine cycle systems of similar complexity (Comparative Examples 2-3).

The foregoing examples are merely illustrative, serving to illustrate only some of the features of the invention. The appended claims are intended to claim the invention as broadly as it has been conceived and the examples herein presented are illustrative of selected embodiments from a manifold of all possible embodiments. Accordingly, it is Applicants' intention that the appended claims are not to be limited by the choice of examples utilized to illustrate features of the present invention. As used in the claims, the word "comprises" and its grammatical variants logically also subtend and include phrases of varying and differing extent such as for example, but not limited thereto, "consisting essentially of" and "consisting of." Where necessary, ranges have been supplied, those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

What is claimed is:

1. A method of recovering thermal energy using a Rankine cycle system comprising:

(a) transferring heat from a first waste heat-containing stream to a first working fluid stream to produce thereby a first vaporized working fluid stream and a second waste heat-containing stream;

(b) expanding the first vaporized working fluid stream to produce thereby mechanical energy and an expanded first vaporized working fluid stream;

(c) transferring heat from the expanded first vaporized working fluid stream, and the second waste heat-containing stream to a first condensed working fluid stream to produce thereby a second vaporized working fluid stream, a heat depleted second waste heat-containing stream and a first heat depleted working fluid stream;

(d) expanding the second vaporized working fluid stream to produce thereby mechanical energy and the expanded second vaporized working fluid stream;

(e) transferring heat from the expanded second vaporized working fluid stream to a second condensed working fluid stream, to produce thereby a stream of the working fluid having greater enthalpy than the second condensed working fluid stream, and a second heat depleted working fluid stream; and (f) combining the first heat depleted working fluid stream with the second heat depleted working fluid stream to produce thereby a consolidated heat depleted working fluid stream.

2. The method according to claim 1, further comprising a step:

(g) condensing the consolidated heat depleted working fluid stream to produce thereby a first consolidated condensed working fluid stream.

3. The method according to claim 2, further comprising a step:

(h) pressurizing the first consolidated condensed working fluid stream to produce thereby a second consolidated condensed working fluid stream.

4. The method according to claim 3, further comprising a step:

(i) dividing the second consolidated condensed working fluid stream to produce thereby at least two condensed working fluid streams.

5. The method according to claim 1, wherein the working fluid is carbon dioxide in a supercritical state during at least a portion of at least one method step.

* * * * *